United States Patent [19]

Gemmani

[11]  4,243,085
[45]  Jan. 6, 1981

[54] PLANER WITH NOISE-REDUCING MEANS

[76] Inventor: Giuseppe Gemmani, Via Marecohiese 20, Rimini, Province of Forli, Italy

[21] Appl. No.: 914,955

[22] Filed: Jun. 12, 1978

[30] Foreign Application Priority Data

Jun. 13, 1977 [IT]   Italy ............................... 12015 A/77

[51] Int. Cl.³ ....................................... B27G 13/04
[52] U.S. Cl. ............................ 144/230; 144/117 R; 144/221
[58] Field of Search .......... 144/42, 43, 114 R, 117 R, 144/117 A, 117 B, 117 C, 118, 162 R, 174, 218, 230; 83/835–855

[56]   References Cited
U.S. PATENT DOCUMENTS

| 3,785,417 | 1/1974 | Vora ................................ 144/230 X |
| 3,933,189 | 1/1976 | Boles et al. ....................... 144/230 X |
| 4,074,737 | 2/1978 | Stewart ............................ 144/117 R |

FOREIGN PATENT DOCUMENTS 1427305  12/1965  France ..................... 144/218

Primary Examiner—W. Donald Bray
Attorney, Agent, or Firm—Guido Modiano; Albert Josif

[57] ABSTRACT

This disclosure relates to a planer provided with means for reducing the noise emitted by the blade-retaining shaft. The blades have a cutting edge projecting from the rotary surface of the shaft. Ahead of each blade with respect to the shaft direction of rotation there is arranged a deflecting surface which deflects the air flow over the cutting edge and has a free edge whose distance from the axis of rotation of the blade-retaining shaft is smaller than that of the cutting edge.

1 Claim, 1 Drawing Figure

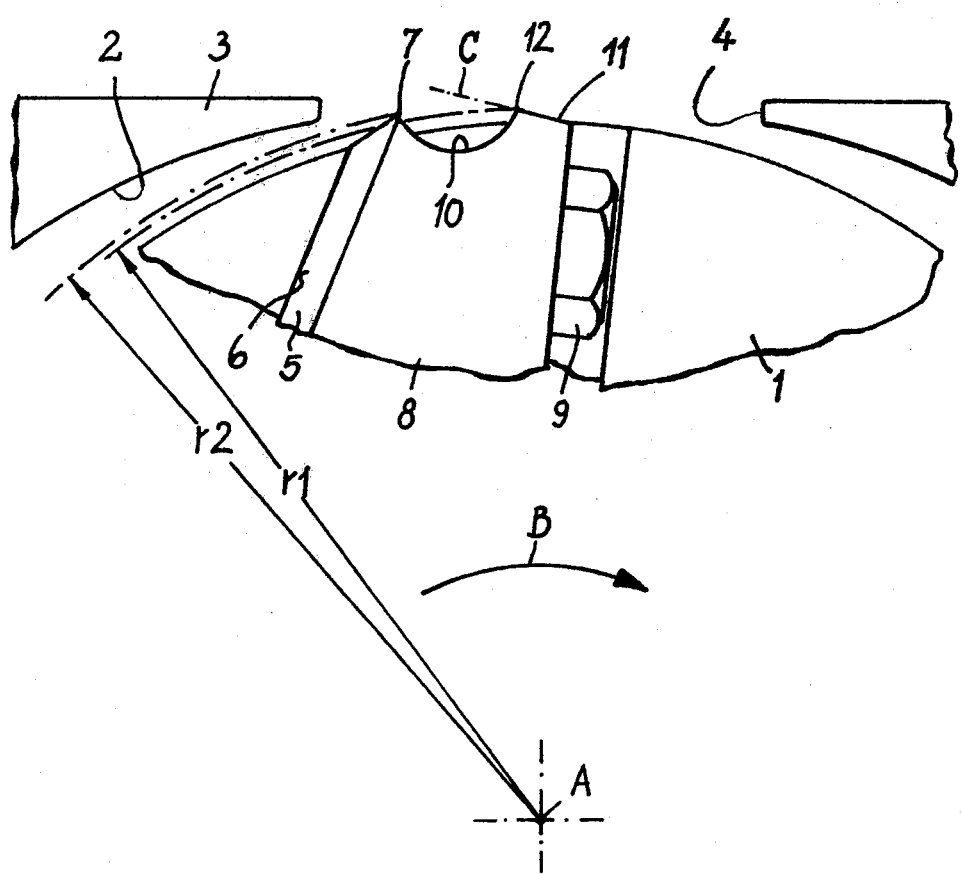

PLANER WITH NOISE-REDUCING MEANS

BACKGROUND OF THE INVENTION

This invention relates to a planer provided with means for reducing the noise emitted by the blade-retaining shaft. The invention is especially useful in reducing the noise emitted by wood planers.

The tool bit holder shafts of conventional wood planing machines comprise generally a cylindrical shaft arranged for rotation about a horizontal axis, wherein one or more seats with longitudinal and radial lay are formed to receive the tool bits, e.g. blades. Such blades are secured in the respective seats by means of gibs (strips) and bolts, such that the cutting edges project from the cylindrical shaft surface to permit removal of wood shavings.

The blade carrying shaft is pivotally supported in a chamber which is open at the working surface area where the blades are brought into contact with the work-piece.

The main portion of the noise generated by a shaft of this kind is due to the impact of the blade portion protruding from the outer surface of the shaft with the surrounding air, as the blades move past the apertured area of the table or working surface. The quick succession of such impacts and the repeated expansions and compressions of the air at said area produce a noise which is both disturbing and harmful for the planer operator(s), it reaching occasionally untolerably high levels.

SUMMARY OF THE INVENTION

It is an object of this invention to provide a planer in which the noise level is substantially reduced.

This object is achieved by a planer with noise reducing means comprising a shaft rotating about a horizontal axis and defining a rotary surface, a plurality of seats longitudinally extending in said shaft and radially open outwards, a plurality of blades and blades-retaining gibs accomodated in said seats, said blades having a cutting edge projecting from said rotary surface and each gib being arranged ahead of each respective blade with respect to the shaft direction of rotation, wherein according to the improvement said gibs are provided with a longitudinally extending deflecting surface for deflecting the air flow over the cutting edge during rotation of the shaft, said deflecting surface having a free edge whose distance from the axis of rotation of said shaft is smaller than that of the cutting edge.

BRIEF DESCRIPTION OF THE DRAWING

Further features will be apparent from the following description of an embodiment of this invention, illustrated by way of example only in the accompanying drawing, the only FIGURE whereof shows an axial view of a portion of a tool-holding shaft.

DESCRIPTION OF THE PREFERRED EMBODIMENTS

In the drawing, the tool-holding shaft is indicated at 1 and pivotally supported for rotation about a horizontal axis A, as is conventional in the art. The shaft 1 rotates in a cavity 2 under the working surface or table 3, whereon the workpiece is placed and caused to move forward. In the surface 3, there is provided an opening or aperture 4 wherethrough the tools are allowed to act on the workpiece.

The tool bits are blades 5 received in seats 6 extending longitudinally in the shaft 1 and open radially outwards. The blades 6 have a cutting edge 7 which projects from the rotary surface of the shaft 1 and with respect to said edge with the working surface or table 3, during the planer operation, is so positioned as to cause the cutting edge 7 to protrude also from the surface of the table, to come in contact with the work-piece to be planed.

The blades 5 are retained in their seats 6 by gibs or strips 8 which are secured by means of bolts 9. The outward facing side of the gibs 8 is formed with a groove 10 and inclined surface 11 which, with respect to the direction B of rotation of the shaft 1, remain ahead of the cutting edge 7. The groove 10 constitutes the shaving discharge groove, whereas the surface 11 forms a sort of baffle or deflector member, orientated along a direction C which extends above the cutting edge 7. Obviously, the distance r1 of the free edge 12 of the baffle 11 from the axis A is smaller than the distance r2 of the cutting edge 7, thereby the latter is enabled to remove shavings from the workpiece.

It will be apparent for the expert in the art that during the shaft 1 rotation the baffle 11 is effective to deflect the air flow above the cutting edge 7, thus preventing the blades from striking against "solid" air, maintaining the air flow laminar, and reducing the noise level, especially at high speeds.

In practicing the invention, the baffle, rather than being provided on the gib, may be formed on the shaft, or alternatively, made from a sheet metal member secured ahead of the blade.

I claim:

1. A planer with noise reducing means comprising a shaft rotating about a horizontal axis and defining a rotary surface, a plurality of seats longitudinally extending along said shaft and radially open outwards, a plurality of blades and blades retaining gibs accomodated in said seats, said blades having a cutting edge projecting from said rotary surface and each gib being arranged ahead of each respective blade with respect to the shaft direction of rotation, wherein according to the improvement said gibs are provided with a longitudinally extending deflecting surface which is inclined with respect to the rotary surface of the shaft so that its prolongation extends above said cutting edge for deflecting the air flow thereover, said deflecting surface having a free edge radially external to the rotary surface of the shaft and having a distance from the axis of rotation of said shaft which is smaller than that of the cutting edge.

* * * * *